(12) United States Patent
Nikitopoulos et al.

(10) Patent No.: US 12,418,357 B2
(45) Date of Patent: Sep. 16, 2025

(54) APPARATUS AND METHOD FOR DETECTING MUTUALLY INTERFERING INFORMATION STREAMS

(71) Applicant: University of Surrey, Guildford (GB)

(72) Inventors: Konstantinos Nikitopoulos, Guildford (GB); Rahim Tafazolli, Guildford (GB); Christopher Husmann, Guildford (GB)

(73) Assignee: University of Surrey, Surrey (GB)

( * ) Notice: Subject to any disclaimer, the term of this patent is extended or adjusted under 35 U.S.C. 154(b) by 0 days.

(21) Appl. No.: 18/647,607

(22) Filed: Apr. 26, 2024

(65) Prior Publication Data

US 2024/0275516 A1 Aug. 15, 2024

Related U.S. Application Data

(63) Continuation of application No. 16/638,091, filed as application No. PCT/GB2018/052271 on Aug. 9, 2018, now Pat. No. 12,003,318.

(30) Foreign Application Priority Data

Aug. 10, 2017 (GB) ...................................... 1712840

(51) Int. Cl.
*H04L 1/00* (2006.01)
*H04W 52/24* (2009.01)

(52) U.S. Cl.
CPC .......... *H04L 1/0003* (2013.01); *H04L 1/0063* (2013.01); *H04W 52/243* (2013.01)

(58) Field of Classification Search
CPC ................... H04L 1/005; H04L 1/0054; H04L 25/03292; H04L 25/03331;
(Continued)

(56) References Cited

U.S. PATENT DOCUMENTS 5,568,400 A 10/1996 Stark et al.
6,466,632 B1 10/2002 Igarashi et al.
(Continued)

FOREIGN PATENT DOCUMENTS

CN 101056131 A 10/2007
CN 101207404 A 6/2008
(Continued)

OTHER PUBLICATIONS

Chinese Patent Office, Office Action, Application No. 201880064940. 3, Aug. 2, 2022, 10 pages.
(Continued)

*Primary Examiner* — Aristocratis Fotakis
(74) *Attorney, Agent, or Firm* — Ryan Dean; Umberg Zipser LLP

(57) ABSTRACT

Apparatus and methods for performing symbol detection on a plurality of mutually interfering information streams transmitted in a wireless communication system are disclosed. The apparatus comprises a detector configured to receive an input signal comprising a plurality of mutually interfering information streams, and to detect a transmitted symbol for one of the plurality of mutually interfering information streams by searching for a vector solution to an optimization problem, and a detection evaluation module configured to classify the detected symbol as reliable or unreliable, and/or to determine whether current system conditions permit reliable symbol detection and to take a predetermined action to improve the detection reliability according to a result of the determination. In some embodiments a decoding algorithm is then applied to the plurality of detected symbols to recover information from said one of the mutually interfering information streams.

17 Claims, 6 Drawing Sheets

(58) Field of Classification Search
CPC ......... H04L 25/03324; H04L 25/03242; H04L 1/0063; H04L 1/0061; H04L 2025/03726
See application file for complete search history.

(56) References Cited

U.S. PATENT DOCUMENTS

| | | | |
|---|---|---|---|
| 7,016,440 | B1 | 3/2006 | Singer et al. |
| 7,593,492 | B1 | 9/2009 | Lande |
| 8,705,600 | B1 | 4/2014 | Song et al. |
| 9,942,013 | B2 | 4/2018 | Malladi et al. |
| 2003/0139139 | A1 | 7/2003 | Onggosanusi et al. |
| 2004/0243258 | A1* | 12/2004 | Shattil ............... H04L 27/265 700/55 |
| 2005/0204273 | A1 | 9/2005 | Jeong et al. |
| 2006/0018410 | A1* | 1/2006 | Onggosanusi ....... H04B 7/0854 375/340 |
| 2007/0201577 | A1 | 8/2007 | Vasil'evich et al. |
| 2008/0181339 | A1* | 7/2008 | Chen ............... H04L 25/03242 375/262 |
| 2009/0116544 | A1 | 5/2009 | Zhang et al. |
| 2010/0054372 | A1 | 3/2010 | Eckert |
| 2010/0098194 | A1* | 4/2010 | Reial ............... H04L 25/067 375/348 |
| 2013/0283134 | A1* | 10/2013 | Bai ............... H03M 13/3738 714/794 |
| 2014/0016726 | A1* | 1/2014 | Khayrallah ....... H04L 25/03178 375/316 |
| 2014/0153628 | A1 | 6/2014 | Vojcic et al. |
| 2014/0211831 | A1 | 7/2014 | Zhou et al. |
| 2014/0286298 | A1 | 9/2014 | Yoshimoto et al. |
| 2015/0326360 | A1 | 11/2015 | Malladi et al. |
| 2017/0324462 | A1 | 11/2017 | Chen et al. |
| 2018/0176049 | A1* | 6/2018 | Nikitopoulos .... H04L 25/03242 |

FOREIGN PATENT DOCUMENTS

| | | |
|---|---|---|
| CN | 105827354 A | 8/2016 |
| CN | 106464467 A | 2/2017 |
| EP | 2056509 A2 | 5/2009 |
| WO | 2010043556 A1 | 4/2010 |

OTHER PUBLICATIONS

European Patent Office, Communication pursuant to Article 94(3) EPC, International Application No. 18 758 692.0, International Filing Date Aug. 9, 2018, 6 pages.

Konstantinos et al., "Approximate MIMO Iterative Processing with Adjustable Complexity Requirements," arxiv.org. Cornell University Library, 201 Olin Library Cornell University, Ithaca, NY 14853, Apr. 13, 2011 (Apr. 13, 2011), XP080549508, DOI: 10.1109/TVT.2011.2179324.

* cited by examiner

APPARATUS AND METHOD FOR DETECTING MUTUALLY INTERFERING INFORMATION STREAMS

TECHNICAL FIELD

The present invention relates to detecting mutually interfering information streams.

BACKGROUND

A significant challenge in designing the next generation of wireless communication systems is the need to meet the ever-increasing demand for higher capacity and throughput. One solution that has been proposed for increasing the system capacity is to transmit multiple information streams on non-orthogonal carriers, enabling the carriers to be more closely spaced in frequency than is possible in orthogonal systems, such as Orthogonal Frequency Division Multiplexing (OFDM). However, a consequence of using non-orthogonal carrier frequencies is that the transmitted streams interfere with one another.

It has been shown in theory that by intentionally transmitting non-orthogonal, and therefore, mutually interfering information streams substantial capacity gains can be achieved. Examples include large distributed multi-antenna Multiple-Input Multiple-Output (MIMO) systems with aggressive spatial multiplexing, emerging techniques like faster-than-Nyquist signalling, as well as non-orthogonal multiple access schemes such as Sparse Code Multiple Access (SCMA). However, decoding mutually-interfering information streams in order to recover the original data has so far proven to be impractical in real-world systems and devices, due to prohibitive complexity and latency requirements.

One candidate solution for detecting mutually interfering information streams is sphere decoding. Sphere decoding translates the Maximum-Likelihood (ML) detection problem into a tree search problem, allowing the complexity for optimally detecting the mutually interfering information streams to be dramatically reduced. Although the gains of sphere decoding increase with the number of mutually interfering information streams, the corresponding processing complexity becomes impractical for high-order modulation alphabets and for large numbers of mutually interfering information streams.

To cope with very large numbers of mutually interfering information streams, in the order of hundreds of streams, suboptimal decoders have been proposed which not only cannot guarantee optimality, but which are only efficient across a limited range of modulation sizes and number of interfering information streams. Examples of suboptimal decoders are the Likelihood Ascendant Search (LAS) algorithm and the Reactive Tabu Search (RTS) algorithm, the performance of which degrades drastically when transmitting dense symbol constellations or for moderate numbers (of the order of tens) of interfering streams. In addition, the latency and complexity of such approaches is variable, and therefore the performance can be significantly degraded under practical latency or complexity constraints.

Another family of detectors for systems with very large numbers of mutually interfering information streams are the Probabilistic Data Association (PDA) based detectors. PDA detectors use soft receiver processing to try to iteratively decode the received information streams by looking at one symbol at a time, treating the received symbols as statistically independent, and iteratively approximating the interference-plus-noise term by a multivariate Gaussian distribution. However, the performance of such detectors depends on the accuracy of the iterative Gaussian approximation, and therefore they are more efficient for massive numbers of mutually interfering information streams and low-order symbol constellations. In addition, their complexity scales as $O(N^3)$ instead of the total $O(N^2)$ complexity for LAS or linear detection methods, where N is the number of interfering information streams. A related family of probabilistic algorithms are the Belief Propagation (BP) detection algorithms, which also use a Gaussian approximation for multi-antenna interference and therefore suffer from the same drawbacks as PDA-based detectors. In addition, the complexity of BP detectors scales as $O(aN^2)$, with values of a of the order of $10^3$ (i.e. three orders of magnitude more complex than linear detectors, making BP detectors unsuitable for practical implementations.

Therefore, there remains a need for an improved solution for detecting mutually interfering information streams. The invention is made in this context.

SUMMARY OF THE INVENTION

According to a first aspect of the present invention, there is provided apparatus for performing symbol detection on a plurality of mutually interfering information streams transmitted in a wireless communication system, the apparatus comprising a first detector configured to receive an input signal comprising a plurality of mutually interfering information streams, and to detect a transmitted symbol for each of the plurality of mutually interfering information streams by searching for a vector solution to an optimization problem, and a detection evaluation module configured to classify the detected symbol as reliable or unreliable, and/or to determine whether current system conditions permit reliable symbol detection and to take a predetermined action to improve the detection reliability according to a result of the determination.

In some embodiments according to the first aspect, the predetermined action comprises setting a new pruning parameter and/or a new latency limit when performing subsequent symbol detection.

In some embodiments according to the first aspect, the predetermined action comprises communicating with a transmitter in the wireless communication system in order to change one or more transmission parameters used when transmitting one or more of the mutually interfering information streams. For example, changing the one or more transmission parameters may comprise: reducing the total number of mutually interfering information streams used in the wireless communication system; and/or reducing a modulation order used in one or more of the mutually interfering information streams; and/or increasing a transmission power of one or more of the mutually interfering information streams; and/or changing a coding scheme applied to one or more of the mutually interfering information streams.

In some embodiments according to the first aspect, in response to the detected symbol being classified as unreliable, the apparatus is configured to switch from the first detector to a second detector to perform subsequent symbol detection for said one of the plurality of mutually interfering information streams.

In some embodiments according to the first aspect, the detection evaluation module is configured to determine whether the current system parameters permit reliable symbol detection by calculating a reliability metric relating to a detection reliability of the detected symbol, and comparing the calculated reliability metric to a threshold. The detection evaluation module may be configured to calculate the reliability metric based on a pruning parameter applied by the first detector when searching for the vector solution.

In some embodiments according to the first aspect, the detection evaluation module is configured to perform the determination in response to the search for the vector solution exceeding a preset latency limit.

In some embodiments according to the first aspect, the detector is configured to transform the optimization problem into a tree search and search the tree for the vector solution. The preset latency limit may, for example, be defined in terms of a number of nodes visited during the tree search.

In some embodiments according to the first aspect, the first detector is configured to apply an early cut criterion when searching for the vector solution and to terminate the search if a solution is found which satisfies the early cut criterion, the early cut criterion relating to the probability of a candidate solution being the correct vector solution, and in response to the first detector finding a solution which satisfies the early cut criterion, the detection evaluation module is configured to determine that the detected symbol is reliable.

In some embodiments according to the first aspect, the apparatus further comprises a decoder configured to receive a plurality of detected symbols from the detector and apply a decoding algorithm to the plurality of detected symbols to recover information from said one of the mutually interfering information streams.

In some embodiments according to the first aspect, the detection evaluation module is configured to signal to the decoder whether one or more bits of the detected symbol are reliable or unreliable, according to the result of the determination, wherein for any bits signalled as unreliable by the detection evaluation module, the decoder is configured to attempt to recover correct values of the unreliable bits. The decoder may further be configured to attempt to recover correct values of one or more unreliable bits in a received packet based on values of a plurality of reliable bits in the received packet, and comprises a factor graph constructor configured to construct a factor graph comprising a plurality of variable nodes each corresponding to one bit in the received packet and further comprising one or more check nodes each corresponding to a parity check equation, each check node being connected to one or more variable nodes corresponding to one or more bits included in the parity check equation, and a parity check unit configured to solve the parity check equation for each check node that is connected to a variable node corresponding to an unreliable bit, to determine a correct value of the unreliable bit. Furthermore, in some embodiments, after determining the correct values of the unreliable bits, the parity check unit is configured to calculate the parity check equation for one or more check nodes which are connected only to variable nodes corresponding to reliable bits, and determine that a reliable decoding result has been achieved if the calculated result of the parity check equation for said one or more check nodes matches an expected result.

In some embodiments according to the first aspect, in response to the calculated result of the parity check equation for said one or more check nodes being different to the expected result, the parity check unit is further configured to select one of the variable nodes corresponding to a reliable bit, and determine a corrected value of said reliable bit by solving the parity check equation for a check node connected to the selected variable node.

In some embodiments according to the first aspect, the parity check unit is configured to select said one of the variable nodes by selecting the variable node that is connected to the most check nodes for which the calculated result of the parity check equation for said one or more check nodes is different to the expected result.

In some embodiments according to the first aspect, the apparatus further comprises a data processing module configured to receive data symbols detected by the first detector and symbol classification information from the detection evaluation module, the symbol classification information indicating whether each of the detected data symbols is classified as reliable or unreliable, wherein the data processing module is further configured to process the detected data symbols in accordance with the symbol classification information.

According to a second aspect of the present invention, there is provided a method of performing symbol detection on a plurality of mutually interfering information streams transmitted in a wireless communication system, the method comprising: receiving an input signal comprising a plurality of mutually interfering information streams; detecting a transmitted symbol for each of the plurality of mutually interfering information streams by searching for a vector solution to an optimization problem; and/or classifying the detected symbol as reliable or unreliable and taking a predetermined action to improve the detection reliability according to a result of the determination.

In some embodiments according to the second aspect, the method further comprises applying a decoding algorithm to the plurality of detected symbols to recover information from said one of the mutually interfering information streams.

According to a third aspect of the present invention, there is provided a computer-readable storage medium arranged to store computer program instructions which, when executed, perform a method according to the second aspect.

BRIEF DESCRIPTION OF THE DRAWINGS

Embodiments of the present invention will now be described, by way of example only, with reference to the accompanying drawings, in which.

DETAILED DESCRIPTION

Figure 1:
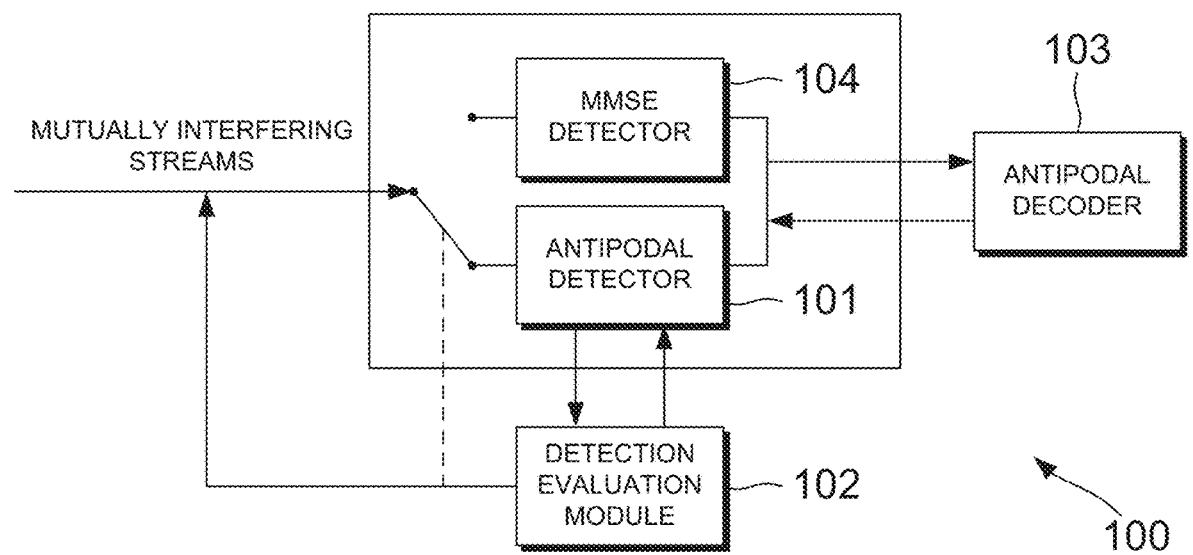
FIG. 1 illustrates apparatus for performing detection and decoding on an input signal comprising a plurality of mutually interfering information streams, according to an embodiment of the present invention.

In the following detailed description, only certain exemplary embodiments of the present invention have been shown and described, simply by way of illustration. As those skilled in the art would realize, the described embodiments may be modified in various different ways, all without departing from the scope of the present invention. Accordingly, the drawings and description are to be regarded as illustrative in nature and not restrictive. Like reference numerals designate like elements throughout the specification.

Embodiments of the present invention make use of the observation that in order for a given vector solution to be highly reliable, there should be no other or only a few solutions with a similar detection metric to the current solution. In this scenario, that is to say, when the number of candidate solutions with a similar value of the detection metric is small, the vector solution can be found relatively quickly using a vector search algorithm by excluding the relatively few other candidate solutions. Different detection metrics maybe used in different embodiments to evaluate the detection reliability. For example, in the case of maximum-likelihood detection, the Euclidean distance of a candidate vector solution to the received vector can be used as the detection metric for evaluating the detection reliability.

On the other hand, in scenarios in which there are a high number of candidate solutions, the detected vector solution can be treated as being less reliable since there are by definition many candidate solutions with similar detection metrics. Consequently, a vector search algorithm employed by the detector would have to visit many candidate solutions before finding the one with the best detection metric, resulting in higher complexity and a longer searching time. Based on this observation, and in order to reduce complexity and latency, embodiments of the invention are configured so as to avoid unnecessarily wasting processing resources in scenarios where the detection result is expected to be unreliable.

Accordingly, in embodiments of the present invention the outcome of the symbol detection process can be considered to be 'antipodal', in the sense that the outcome of the detection process falls into one of two opposing scenarios. In one scenario, the detector is able to find a highly reliable vector solution. In the other scenario, the detector is either not able to find a solution at all, or the solution that is found will not be reliable. Consequently, in the following description the terms 'antipodal detection' and 'antipodal decoding' are used to denote detection and decoding processes respectively in which the outcome is deemed to either be reliable or unreliable. Based on this property, tailored, high performance and low complexity control and detection techniques will now be described in more detail, according to embodiments of the present invention.

Referring now to FIG. 1, apparatus 100 for performing detection and decoding on an input signal comprising a plurality of mutually interfering information streams is illustrated, according to an embodiment of the present invention. Depending on the embodiment, some, all or none of the functional blocks illustrated in FIG. 1 maybe implemented in hardware, or may be implemented in software. The apparatus 100 comprises an antipodal detector 101 configured to receive the input signal and perform symbol detection, a detection evaluation module 102 configured to evaluate the reliability of the symbol detection, and an antipodal decoder 103. The antipodal decoder 103 is configured to receive a plurality of detected symbols from the antipodal detector 101 and apply a decoding algorithm to the plurality of detected symbols, in order to recover information. In some embodiments the transmitted data may not be encoded, and hence the antipodal detector 103 may be omitted.

The detection evaluation module 102 is configured to determine whether reliable detection of the transmitted symbol by the antipodal detector 101 is possible under the current system conditions. Specifically, the detection evaluation module 102 is configured to determine whether the detected symbol is reliable or unreliable. Depending on the embodiment, the detection evaluation may be performed heuristically, probabilistically, or deterministically. In the present embodiment, the detection evaluation module 102 is configured to evaluate if the current system parameters are appropriate for the detector to result in a sufficient number of highly reliable vector solutions. For example, the detection evaluation module 102 may compare the current value of one or more system parameters to a respective preset threshold which is indicative of reliable or unreliable detection conditions.

The system parameters maybe categorised into detection parameters, which are parameters used by the receiving apparatus during symbol detection, and transmission parameters, which are parameters used by the transmitting apparatus when transmitting the plurality of mutually interfering information streams. Examples of detection parameters that can be taken into account by the detection evaluation module 102 when evaluating the detection reliability include, but are not limited to, a pruning criterion that is applied at the antipodal detector 101 to reduce the number of candidate solutions to be searched, and a latency requirement that is applied by the antipodal detector 101. The latency requirement can be used to control the maximum duration of the vector search operation, for example by automatically terminating the vector search once a preset maximum number of nodes have been searched, and/or once a maximum time has elapsed. Examples of transmission parameters that maybe taken into account by the detection evaluation module 102 when evaluating the detection reliability include, but are not limited to, the signal-to-noise-ratio and the mutual interference matrix for the plurality of information streams.

If it is determined that reliable detection is not currently possible, then the detection evaluation module 102 may take predetermined corrective action to improve the detection reliability. Examples of corrective action that can be taken at the receiver-end include, but are not limited to: changing the pruning criterion used by the antipodal detector 101; changing a maximum latency setting applied to the antipodal detector 101; and switching from the antipodal detector 101 to an alternative detector that is capable of providing a more reliable detection result under the current system conditions. For example, the detection evaluation unit 102 may switch from the antipodal detector 101 to a Minimum Mean Square Error (MMSE) detector 104 as shown in FIG. 1. In other embodiments, a different type of alternative detector may be provided. For example, in other embodiments the detection evaluation unit 102 may switch to a Log Likelihood Ratio (LLR) detector, such as a List Sphere decoder or Soft-LAS decoder.

Figure 2:
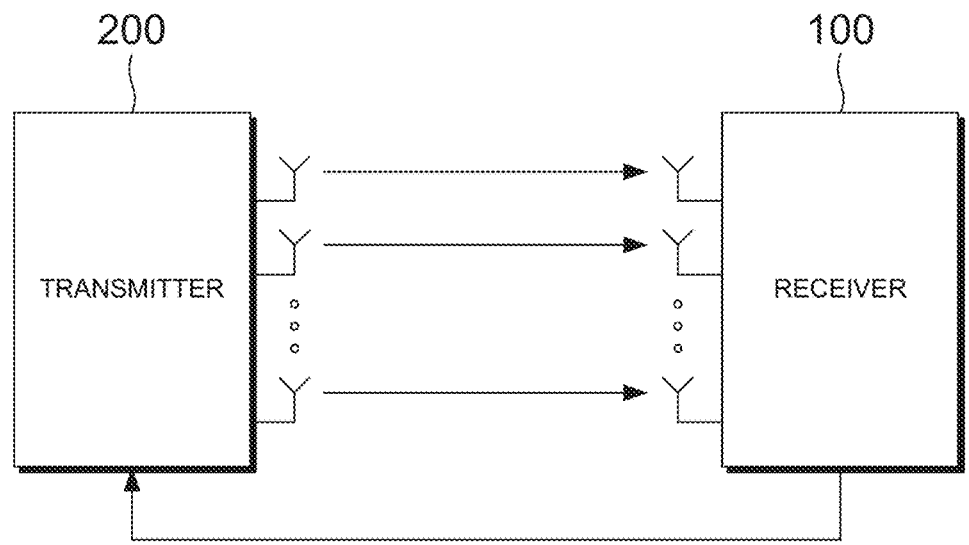
FIG. 2 illustrates a wireless communication system for communicating via a plurality of mutually interfering information streams, according to an embodiment of the present invention.

As shown in FIG. 2, the receiver 100 may be capable of bidirectional communication with the transmitter 200. That is, the receiver 100 may be able to transmit information to the transmitter 200. In such embodiments, the detection evaluation module 102 may be configured to take corrective action by causing certain transmission parameters to be changed at the transmitter, by means of suitable signalling to the transmitter.

Depending on the embodiment, the detection evaluation module 102 may specify to the transmitter which parameters are to be changed, or may simply signal to the transmitter that reliable detection is not currently possible, and the transmitter may then decide which parameters to change. Examples of ways in which the transmission parameters may be modified in order to improve the detection reliability include, but are not limited to: reducing the number of mutually interfering information streams that are transmitted; reducing the modulation order (e.g. a Quadrature Amplitude Modulation order) used in one or multiple interfering information steams; increasing the transmitting power for one or many of the information streams; and changing the code rate or structure.

In some embodiments of the present invention, the detection evaluation maybe performed on a continual basis, that is to say, the detection evaluation module 102 may check at regular intervals whether the detection result is reliable. Alternatively, in some embodiments the detection evaluation module 102 is only triggered to evaluate the detection reliability under certain conditions. In the present embodiment, the detection evaluation module 102 is configured to perform the detection evaluation in response to the search for the vector solution at the antipodal detector 101 exceeding a preset latency limit.

Examples of symbol detection methods that can be used by the antipodal detector 101 in embodiments of the present invention will now be described. In these examples, a $N_t \times N_r$ flat-fading multi-user MIMO channel is assumed, in which multiple single-antenna users simultaneously transmit LDPC-encoded streams to a multi-antenna access point. In other embodiments a different encoding scheme maybe used instead of LDPC, for example convolutional codes or rateless/fountain codes. In general, embodiments of the present invention may be utilised to decode any data stream that requires further processing after detection in order to recover the original information.

When transmitting a vector s over a flat-fading communication channel with $N_t$ mutually interfering transmission stream to $N_r$ receiving entities, for example antennas, the received vector y can be given by:

$$y = Hs + n \quad (1)$$

where H is the $N_r \times N_t$ MIMO channel matrix. The $N_t$ elements of the transmit vector s belong to a complex constellation Q and the set of possible transmission vectors is denoted as $|Q|^{N_t}$. The vector n denotes the $N_r$ dimensional noise vector. The elements of n are independent and identically Gaussian distributed.

In general, in embodiments of the present invention any suitable vector searching method may be used by the antipodal detector 101 to search for the vector solution.

Depending on the embodiment, the antipodal detector 101 may be configured to search for the exact solution to an optimization problem as the vector solution, or to find an approximate solution. Once the vector solution to the optimization problem has been found, then the transmitted symbols are known for each of the mutually interfering information streams. Therefore it is not necessary for the antipodal detector 101 to solve a separate problem for each one of the mutually interfering information streams.

In the present embodiment, the antipodal detector 101 is configured to use a sphere-decoding (SD) based approach to transform the optimization problem into a tree search problem. The antipodal detector 101 of the present embodiment then performs tree traversal in a depth-first mode, and employs Schorr-Euchner enumeration with radius update. In the present embodiment the antipodal detector 101 is configured to find a solution to an optimization problem which involves minimizing the value of the following Maximum Likelihood (ML) metric $s_{ML}$:

$$s_{ML} = \arg \min_{s \in |Q|^{N_t}} = \|y - Hs\|^2 \quad (2)$$

where $|Q|$ is the size of the used modulation alphabet, for example 16 for 16-QAM.

The solution to this optimization problem could be found by performing an exhaustive search over all possible s vectors. However, in the present embodiment the antipodal decoder 101 is configured to simplify the minimization problem by transforming the problem into an equivalent tree search using a SD-based method. In particular, the antipodal decoder 101 is configured to applying QR decomposition to the MIMO channel matrix as H=QR, where Q is an orthonormal matrix and R is an upper triangular matrix. In this way, the ML problem can be transformed into:

$$s_{ML} = \arg \min_{s \in |Q|^{N_t}} = \|\bar{y} - Rs\|^2 \quad (3)$$

where $\bar{y} = Q^* y$. In this embodiment, the tree to be searched has a height of $N_t$ and a branch factor of $|Q|$. Each level l of the tree is related to the symbol transmitted from a specific antenna in the wireless communication system. In addition, each node of a specific level 1 is associated with a partial symbol vector $s_l = [s(N_t-l), \ldots, s(N_t)]$ which contains all potential transmitted symbols down to level 1. Furthermore, each node can be characterized by its Partial euclidean Distance (PD) as follows:

$$c(s_l) = \left(\bar{y}(l) - \sum_{p=l}^{N_t} R(l, p) \cdot s_l(p)\right)^2 + c(s_{l+1}) \quad (4)$$

with R(k, p) being the element of R in at the $k^{th}$ column and the $p^{th}$ row, and y(l) being the $l^{th}$ element of the vector $\bar{y}$. The PD of the root of the tree $c(s_{N_t+1})$ is zero. Then, the ML problem is translated into a problem of finding the leaf node which has the minimum euclidean PD $c(s_1)$. In the example of a depth-first sphere decoder with Schnorr-Euchner enumeration and radius reduction, this can be achieved by setting the initial radius to infinity. Then, whenever the antipodal detector 101 reaches a leaf $s_1$ which has a PD less than the squared radius $r^2$, the radius is updated to $c(s_1)$. Upon reaching a node $s_l$, the antipodal detector 101 checks whether the PD to the node $c(s_l) > r^2$. If the PD is greater than the squared radius, then this node $s_l$, its children and any siblings of the node that have not yet been visited are all pruned.

To define the search order, in the present embodiment the children of a parent node are visited in ascending order of their PDs, according to the Schnorr-Euchner enumeration. As described above, in this embodiment the antipodal detector 101 employs a pruning approach, in which a vector solution or a set of vector solutions is excluded from the search if one or more pruning conditions are met (e.g. $c(s_l) > r^2$). As a result of pruning the search tree, the search space can be reduced, resulting in a reduction in complexity and latency. Depending on the embodiment, probabilistic, deterministic or heuristic pruning metrics may be used. In the present embodiment the pruning metric is probabilistic, and is based on the statistics of the additive white Gaussian noise. In particular, a pruning condition is defined for each layer of the search tree such that for the $l^{th}$ layer, the pruning metric is given by:

$$r_p(l) = \sigma^2 \cdot F^{-1}_{\chi^2(2(N_t-l+1))}(1-\beta) \quad (5)$$

where $r_p(l)$ is the pruning boundary of the l layer of the search tree, $$F^{-1}_{\chi^2(N)}$$

is the inverse of the cumulative distribution function (CDF) of the chi-squared distribution with N degrees of freedom, and $\beta$ is the pruning parameter. During tree traversal, if the PD metric of a node is larger than the pruning metric of the level in which the particular node is located, the antipodal detector 101 can be configured to prune this node and all of its children nodes.

It will be appreciated that this is just one example of a tree pruning method that may be used, and in other embodiments the antipodal detector 101 may employ a different tree pruning method to the one described above. Furthermore, in some embodiments in which the antipodal detector 101 uses a tree search method to find the vector solution, pruning may not be used.

In the present embodiment, the detection evaluation module 102 is configured to characterize a vector solution as highly reliable when only one vector solution passes all of the pruning conditions. On the other hand, if multiple vectors pass the pruning conditions, then the detection evaluation module 102 is configured to classify the outcome as less reliable. In some embodiments, tighter pruning may be used to increase the reliability of the found vector solutions. For the given channel model, the reliability of a solution can be lower bounded by:

$$P(\hat{s} \neq s^*) \leq 4 \cdot N_t \cdot F_{\chi^2(2N_t)}\left(\frac{\sigma^2 \cdot r_p(1)}{D^2_{min} + \sigma^2}\right) \quad (6)$$

where s is a vector solution of the antipodal decoder 103, s* is the actually transmitted vector, $F_{\chi^2(N)}$ is the CDF of the chi-squared distribution, and $D_{min}$ is the minimum distance between any two symbols of the applied modulation. The pruning boundary $r_p(1)$, which is defined in equation (5) above, is the monotonic decreasing function of the pruning parameter $\beta$. Increasing the value of the pruning parameter $\beta$ has the effect of increasing the reliability of the outcome of the antipodal detector 101. In some embodiments of the invention, if no solution or multiple candidate solutions are found during the search, then the antipodal detector 101 may be configured to re-initiate the search using new pruning criteria, for example a lower pruning parameter $\beta$. However, in the present embodiment the antipodal detector 101 does not re-initiate the search. A decreased value of the pruning parameter $\beta$ leads to larger pruning boundaries, and by repeatedly decreasing $\beta$ eventually one or multiple vectors may be found that passes all of the less tight pruning conditions. Conversely, when the antipodal detector 101 finds a large number of solutions, the search could be re-initiated with a higher pruning parameter $\beta$. An increased value of $\beta$ leads to smaller pruning boundaries, such that eventually one or only a small number of vector solutions from the initial search will fulfil at least one of the tighter pruning conditions.

In embodiments of the present invention, a maximum processing latency requirement may be set for the antipodal detector 101. In the present embodiment a maximum processing latency requirement is set in terms of a maximum number of visited nodes. If the antipodal detector 101 has not found a vector solution within the maximum latency requirement, then the search is terminated and the detector results in no outcome. When no solution is found the received symbol is erased, i.e. discarded and not used for further processing. In this way, the apparatus can avoid subsequent errors that may arise as the result of relying on incorrect data symbols. In some embodiments, the receiver may request the transmitter to re-transmit the erased data symbol.

In embodiments in which encoding is applied to the mutually interfering information streams by the transmitter, a pruning metric may be used which is related to the error correction capabilities of a related decoder at the receiver. In the present embodiment, as shown in FIG. 1, the apparatus includes an antipodal decoder 103. In this embodiment, the antipodal detector 101 is configured to adjust the pruning parameter in order to ensure that the probability of not finding a solution ($P_{Er}$) is below a threshold $\tau_E$, where $\tau_E$ is chosen with respect to the erasure tolerance of the antipodal decoder 103.

Furthermore, in some embodiments the antipodal detector 101 may employ an early cut criterion in order to terminate the search early when a reliable vector solution has been found. This criterion may be directly or indirectly related to the probability that an examined vector is the correct vector solution, and therefore related to the reliability of the detection outcome. In the present embodiment an early cut criterion based on the statistics of the MIMO channel is employed by the antipodal detector 101, assuming a Rayleigh fading MIMO channel. The antipodal detector 101 terminates the search and classifies the outcome as reliable when the algorithm finds a leaf node with a PD smaller than the early cut threshold T, which in the present embodiment is defined as:

$$T = (D_{min}^2 + \sigma^2) \cdot F_{\chi^2(2N_t)}^{-1}\left(\frac{\Delta}{4 \cdot N_t}\right) \quad (7)$$

where $\Delta$ is the early cut parameter, approximation the probability that an erroneous vector has a PD smaller than the early cut threshold. Again, heuristic or deterministic methods may be used to calculate an early cut criterion.

In embodiments in which the antipodal detector 101 applies an early cut criterion when searching for the vector solution, the detection evaluation module 102 can be configured to determine that the detected symbol is reliable in response to the antipodal detector 101 finding a solution which satisfies the early cut criterion. On the other hand, if the solution that is found by the antipodal detector 101 does not satisfy the early cut criterion, then the detection evaluation module 102 can check whether the detected symbol is reliable or unreliable using any of the other methods described herein, for example by calculating a reliability metric as defined in equation (6).

In some embodiments of the invention, when no highly reliable solution is found, the outcome of the antipodal detector 101 maybe an erasure (i.e. no solution). Alternatively, in other embodiments, when no highly reliable solution is found the antipodal detector 101 can be configured to provide either a soft output in the form of a continuous value, for example in terms of likelihood ratios, or a hard output (i.e. discrete value) by any suitable method, such as successive interference cancellation, hard and soft zero-forcing, or minimum mean square error detection. In the present embodiment, the antipodal detector 101 is configured to handle all unreliable solutions, that is, all cases in which the detector 101 found no solution or found multiple vectors which passed all pruning conditions, as erasures. In embodiments in which encoding is used, the information of the erased vectors may still be retrievable during decoding by the antipodal decoder 103.

As described above, in the present embodiment a latency limit is set for the antipodal detector 101 in the form of a maximum processing latency requirement. When the antipodal detector 101 exceeds the latency limit, detecting evaluation is triggered, and the antipodal detector 101 is configured to provide the detection evaluation module 102 with a vector, $p_t$, which describes the path to the last node that was visited during the vector search before the search was terminated. In the vector $p_t$, the $i^{th}$ element denotes the sorted position of the corresponding node at the tree level $N_t + 1 - i$. The detection evaluation module 102 is configured to calculate a metric based on $p_t$. The metric may be a metric that is related to the probability that the correct vector solution has been visited, or a metric that is related to the probability that the correct vector solution has been pruned from the search.

In the present embodiment, the antipodal detector 101 is configured to use a SD method to transform the optimization problem into a tree search and search the tree for the vector solution detection, and the detection evaluation module 102 is configured to calculate a metric P as:

$$P(\hat{s} \in S) \approx \left(\sum_{k=1}^{p_t(1)-1} P_c(k, N_t)\right) \quad (8)$$

-continued
$$+ \sum_{q=2}^{L_t}\left(\left[\prod_{\rho=1}^{q-1} P_c(p_t(\rho), N_t - \rho + 1)\right] \cdot \sum_{k=1}^{p_t(q)-1} P_c(k, N_t - q + 1)\right) \quad (9)$$

with $$P_c(n, l) \approx (1 - P_e(l)) \cdot (P_e(l))^{(n-1)} \quad (10)$$

and $$P_e(l) = \left(2 + \frac{2}{\sqrt{|Q|}}\right) \cdot \text{erfc}\left(\frac{|R(l, l)| \cdot \sqrt{E_s}}{\sigma}\right) \quad (11)$$

where S denotes the already searched space of the SD tree, erfc is the complementary error function, Es denotes the average power of the transmitted symbols, $\sigma^2$ denotes the noise variance, and $L_t$ denotes the level of the last visited node of the tree search before being terminated due to the latency limit being exceeded. The function values of $P_c(n, l)$ as well as $\Sigma_{k=1}^m P_c(k, l)$ can be stored in $N_t \times |Q|$ look up tables. Using such lookup tables, the cost per channel to calculate the second term (9) in the equation shown above for P is of the order $O(N_t)$.

In the present embodiment, low values of the metric denote insufficient system conditions for the given latency requirements. To put it another way, low values indicate that under the current system conditions, the antipodal detector 101 is unable to solve the optimization problem and find a reliable vector solution without exceeding the maximum processing latency requirement. For example, the detection evaluation module 102 may be configured to classify the system conditions as insufficient to allow reliable detection if even a single detection attempt exceeds the latency requirement, and if the metric value is below 0:15. In addition, the detection evaluation module 102 may be configured to classify the system conditions as insufficient to allow reliable detection when the average metric value over a certain number of searches, for example 5 searches, is below 0:7, and to allocate a metric value of 1 if the search does not meet the maximum latency requirements.

Continuing with reference to FIG. 1, in the present embodiment the apparatus is configured to decode multi-user MIMO spatially-multiplexed streams that have been low-density parity check (LDPC) encoded. For example, the antipodal detector 101 can be compatible with Turbo Codes and Rateless/Fountain Codes.

Figure 3:
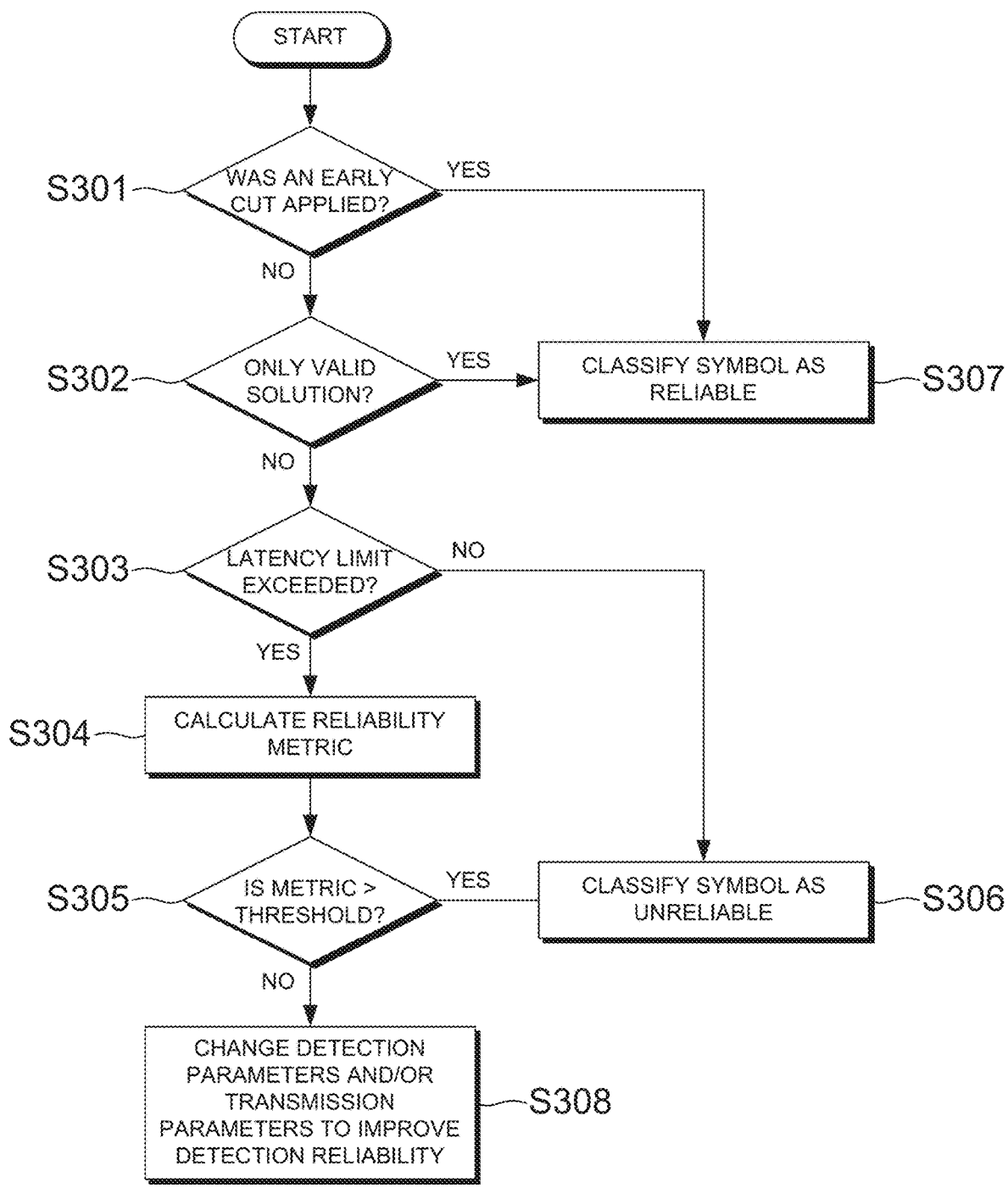
FIG. 3 is a flowchart showing a method of performing symbol detection on one of a plurality of mutually interfering information streams, according to an embodiment of the present invention.

An example of an antipodal detection method according to an embodiment of the present invention is illustrated in FIG. 3. The method allows the detection evaluation module 102 to classify the output of the antipodal detector 101 as either reliable or unreliable. The method also allows the detection evaluation module 102 to determine whether the system parameters and the current operational scenario are appropriate for the antipodal detector 101 to arrive at a sufficient number of highly reliable vector solutions.

In this embodiment, the detection evaluation module 102 starts in step S301 by checking whether the antipodal detector 101 performed an early cut during the detection process. An early cut can be performed when an early cut criterion is satisfied, for example as shown in equation (7). If an early cut was performed, then the detection evaluation module 102 proceeds directly to step S307 and classifies the symbol as reliable. On the other hand, if an early cut was not performed, then in step S302 the detection evaluation module 102 checks whether the solution that was found was the only valid solution. If so, then the symbol can be classified as reliable in step S307. If the solution as not the only valid solution, then the detection evaluation module 102 proceeds to step S303 and checks whether a latency limit was exceeded during the detection process. If not, then the detection evaluation module 102 proceeds to step S306 and classifies the symbol as unreliable.

In step S303, if it is determined that the latency limit was exceeded, then in step S304 the detection evaluation module 102 calculates a reliability metric in order to determine whether or not to take action to improve the detection reliability. If the calculated metric is found to be greater than a threshold in step S305, then the detection evaluation module 102 determines that the symbol can be classified as unreliable, but that no further action is needed in terms of modifying the transmission and/or detection parameters. However, if the reliability metric is less than the threshold, then in step S3o8 the apparatus 100 can take suitable action to improve the detection reliability, for example by changing one or more of the detection parameters and/or the transmission parameters as described above, or by switching to an alternative detector.

Figure 4:
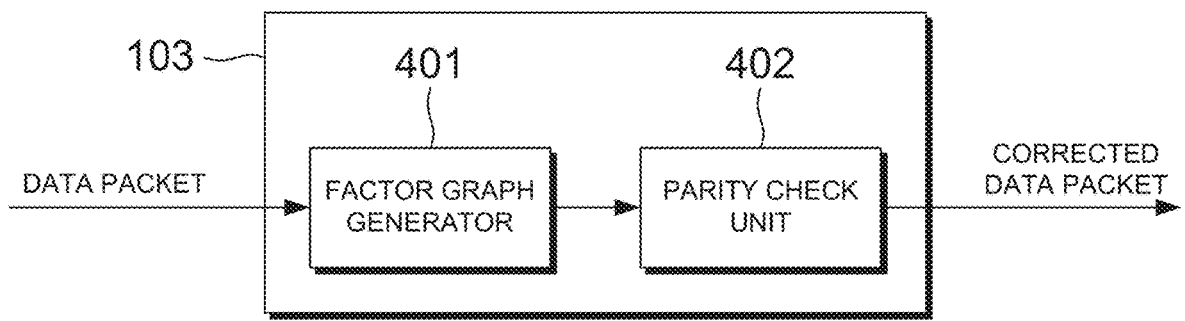
FIG. 4 illustrates an antipodal decoder according to an embodiment of the present invention.
Figure 5:
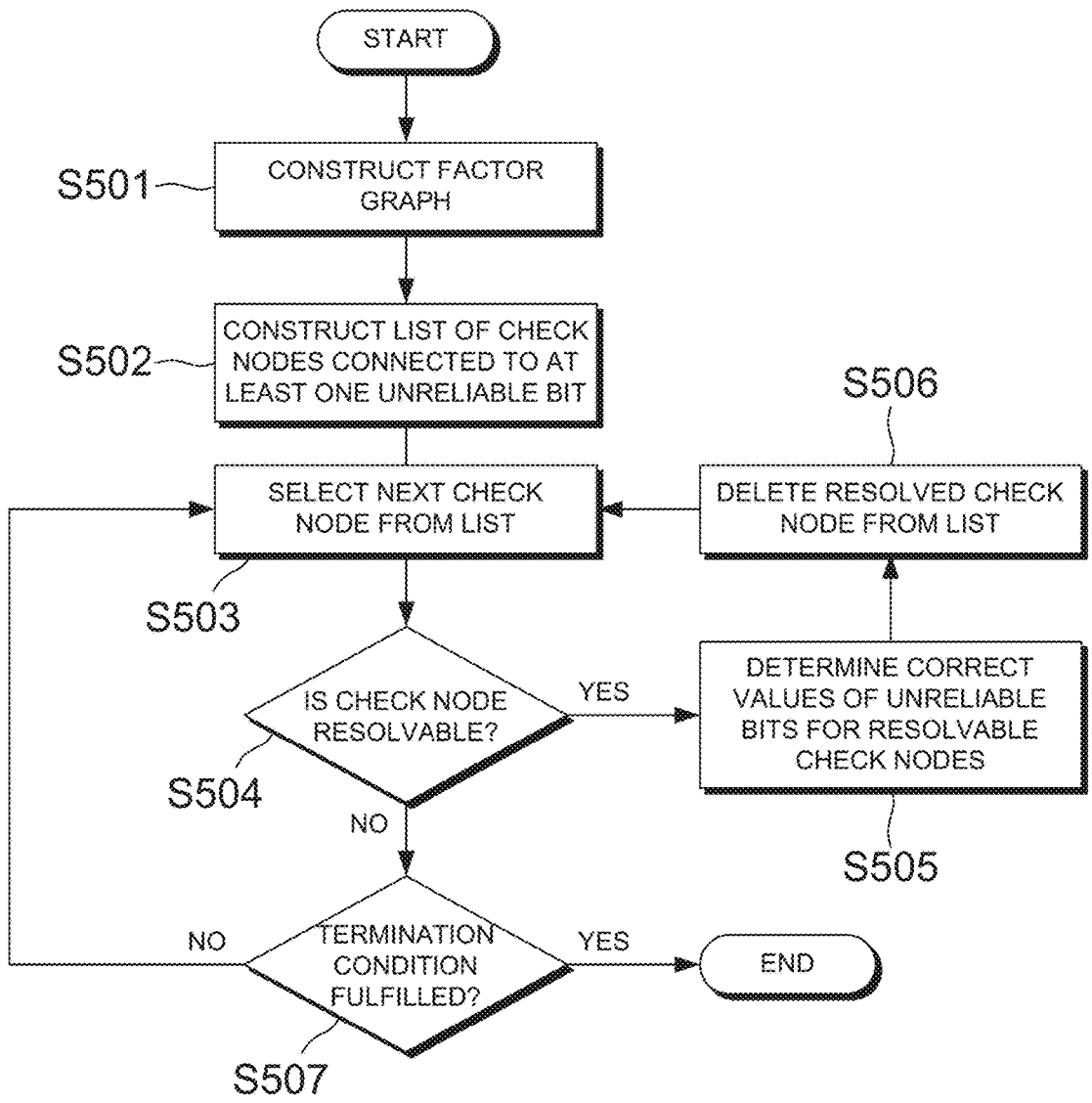
FIG. 5 is a flowchart showing an antipodal decoding method, according to an embodiment of the present invention.
Figure 6:
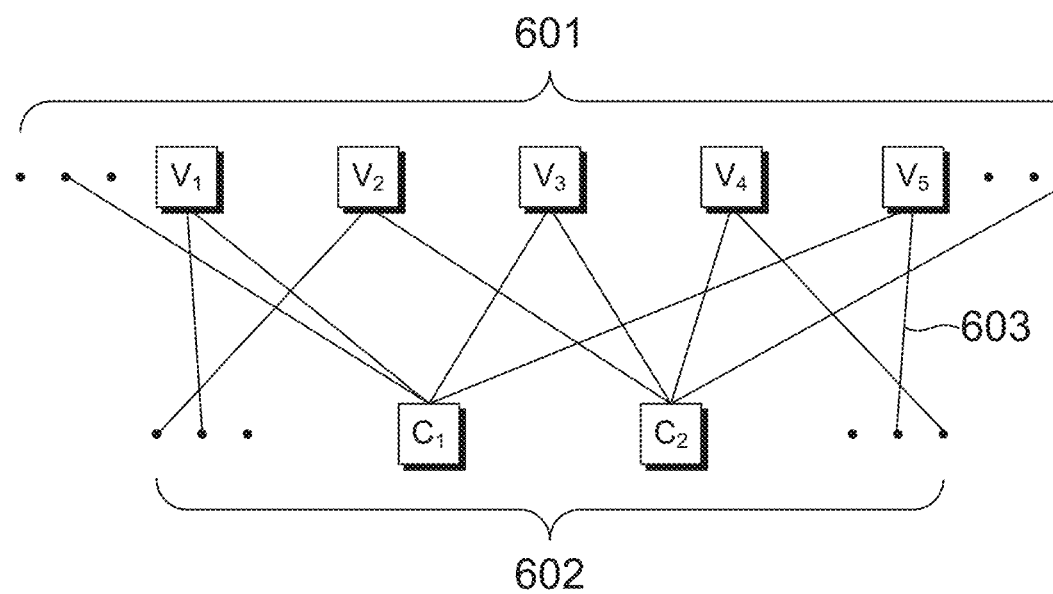
FIG. 6 illustrates a factor graph for use during antipodal decoding, according to an embodiment of the present invention.

The operation of the antipodal decoder 103 will now be described with reference to FIGS. 4 to 6. FIG. 4 schematically illustrates a structure of the antipodal decoder 103, and FIG. 5 is a flowchart showing the antipodal decoding method performed by the antipodal decoder 103 of FIG. 4, according to an embodiment of the present invention. The antipodal decoder 103 comprises a factor graph generator 401 and a parity check unit 402. FIG. 6 illustrates a factor graph that is generated by the factor graph generator 401 during the antipodal decoding process.

The antipodal decoder 103 can decode vectors provided by the antipodal detector 101 in order to recover information from the mutually interfering information streams, by determining correct values for any unreliable bits among the symbols detected by the antipodal detector 101. Depending on the embodiment, antipodal decoding can take place directly after antipodal detection, or after several iterations of the antipodal detection process. The antipodal detector 101 may forward its output to the antipodal decoder 103 in a format which signals to the antipodal decoder 103 whether each bit is reliable or unreliable. In the present embodiment, reliable bits are represented as either zero or one, and unreliable bits are treated as erasures and are represented by another value, denoted here as 'e'. For example, the antipodal detector 101 may use two bits to output each detected bit to the antipodal decoder 103, by using '00' to signal a reliable bit with a value of zero, '11' to signal a reliable bit with a value of one, and '01' or '10' to signal an erased (i.e. unreliable) bit. The antipodal decoder 103 attempts to retrieve the erased bits in order to recover the original information.

The antipodal decoder 103 may use any suitable decoding scheme to determine the correct values of the unreliable bits, depending on the particular encoding scheme applied by the transmitter. Examples of encoding schemes that may be applied in embodiments of the present invention include, but are not limited to, low-density-parity check (LDPC) codes, convolutional codes, and rateless/fountain codes.

In the present embodiment, the antipodal decoder 103 receives a vector d from the antipodal detector 101. The vector d contains the antipodal information of the detected bits for a transmitted packet, i.e. information which indicates whether each bit is considered reliable or unreliable. The dimension of the vector d is 1×B, where B denotes the packet length. The elements of d take one of three values [0; 1; e], where e represents an erased bit and [0; 1] represent reliable bits.

The antipodal decoding process begins in step S501 by constructing a factor graph as shown in FIG. 6. The factor graph comprises a plurality of variable nodes $V_i$ 601 and a plurality of check nodes $C_i$ 602, connected by edges 603. Each variable node $V_i$ 601 is only connected to check nodes $C_i$ 602, and each check node $C_i$ 602 is only connected to variable nodes $V_i$ 601. Each variable node $V_i$ 601 corresponds to the $i^{th}$ coded bit in the packet received from the antipodal detector 101, and each check node $C_i$ 602 corresponds to one parity check equation. Each variable node $V_i$ 601 may therefore correspond to either a reliable bit or an unreliable bit. In the present embodiment LDPC encoding is applied, and so each check node $C_i$ 602 corresponds to one LDPC code. However, other types of encoding scheme may be employed in other embodiments.

Once the factor graph has been generated, then in step S502 the antipodal decoder 103 checks whether any of the check nodes $C_i$ 602 are resolvable. In the present embodiment, a check node is considered resolvable if it is connected to only one erased (i.e. unreliable) bit. Therefore in the present embodiment, the value of the erased bit connected to a resolvable check node 602 can be calculated using the parity check equation corresponding to that check node:

$$V_e = \sum_{\forall i \in \Phi, i \neq e} V_i \qquad (12)$$

where $\Phi$ is the set of indexes of the variable nodes $V_i$ 601 connected to the resolvable check node $C_1$ 602, and $V_e$ is the variable node where the related erasure lies.

In the present embodiment, in step S502 the parity check unit 402 creates a list $L_e$ of all check nodes 602 that are connected to at least one variable node 601 representing an erased bit. Each check node 602 that is added to the list $L_e$ may be resolvable or unresolvable, depending on whether the check node 602 is connected to one erased bit or to a plurality of erased bits.

In steps S503 and S504, the parity check unit 402 proceeds to examine each check node 602 on the list $L_e$ in turn to determine whether or not it is resolvable. Specifically, in step S503 the parity check unit 402 starts by selecting the first check node on the list, and in step S504 the parity check unit 402 determines whether the selected check node is resolvable. When a resolvable check node is found, the parity check unit 402 proceeds to step S505 and recovers the corresponding erased bit. In step S505, the parity check unit 402 calculates the correct value of the erased bit using the corresponding parity check equation for the selected check node. Then, in step S506 the parity check unit 402 deletes the check node from the list $L_e$, and returns to step S503 where the next check node on the list $L_e$ is selected. In this way, check nodes are then deleted from the list $L_e$ as the corresponding erased bits are recovered.

The parity check unit 402 may follow an iterative process during antipodal decoding, in which one iteration is completed once the parity check unit 402 reaches the end of the list $L_e$. After completing one iteration, the parity check unit 402 can return to step S503 and start at the beginning of the list again, to search for newly-resolvable check nodes. Check nodes that are initially unresolvable may become resolvable during a later iteration, once values of some of the corresponding erased bits have been recovered as a result of processing resolvable check nodes connected to the same erased bits. Constructing an initial list in step S502 of all check nodes which are connected to at least one erased bits enables efficient processing, since in subsequent iterations of steps S503 and S504 the parity check unit 402 can ignore any check nodes that are not on the list, and so only needs to determine whether each check node remaining on the list is now resolvable. However, in other embodiments, in step S502 the parity check unit 402 may only search for resolvable check nodes and may ignore unresolvable check nodes. In such embodiments, the parity check unit 402 may return to step S502 at the start of each iteration and construct a new list of resolvable check nodes.

In the present embodiment, if the visited check node is found not to be resolvable in step S504, the parity check unit 402 proceeds to step S507. In step S507 the parity check unit 402 checks whether a termination condition has been fulfilled. Various termination conditions may be applied in step S507. For example, the parity check unit 402 may be configured to repeatedly process the list $L_e$ either until it becomes empty, i.e. when all check nodes have been deleted from the list in step S506, or until no resolvable check nodes were found in the list during the previous iteration. As a further example, in some embodiments of the invention the antipodal process may be terminated in step S507 when a predefined processing latency requirement is met.

In the present embodiment, the antipodal decoding process is terminated once there are no resolvable check nodes left on the list $L_e$. However, in other embodiments in this scenario the antipodal decoding process could continue, for example by using a trial-and-error approach in which the antipodal decoder 103 guesses at values of erased bits for the check node that is connected to the smallest number of erased bits, and then working through the list to determine whether the parity check equations for other check nodes can be solved using the guessed values. If no, new candidate values could be chosen for the guessed erased bits, and the process repeated. In such embodiments the antipodal decoder 103 could continue for a preset number of iterations, or until a latency limit is exceeded.

In some embodiments of the invention the antipodal decoder 103 may also apply error correction to the reliable bits after recovering any erased bits, in order to correct any bit errors that may have occured within the reliable bits. In this way the antipodal decoder 103 can correct single bit detection errors in the reliable bits, by performing further decoding iterations. Particularly for long code words lengths, this approach can provide superior decoding performance compared to traditional belief-propagation decoders.

In some embodiments of the invention, further steps can be taken to determine whether the joint antipodal detection and antipodal decoding process has resulted in a highly reliable outcome. In particular, even if the antipodal detector 101 has classified a detected symbol, and therefore the corresponding bits, as highly reliable, it is possible that the symbol could still be incorrect and therefore some of the bits may be erroneous. To mitigate against this, in some embodiments, after all erasures have been recovered by the antipodal decoder 103 the parity check unit 402 can be configured to check whether the parity checks are valid at all check nodes, including check nodes that are only connected to reliable bits. If the parity checks across all check nodes are found to be correct, then the output of the antipodal decoder 103 can be characterized as highly reliable. If any of the parity checks are found to be incorrect, then the output of the antipodal decoder 103 can be characterized as unreliable, indicating that a detection error may have occurred at the antipodal detector 101. In this sense, the output of the antipodal decoder 103 can also be considered to be antipodal (i.e. reliable or unreliable).

In some embodiments, when the output of the antipodal decoder 103 is determined to be unreliable, further action can be taken to increase the detection and/or decoding reliability. For example, the variable nodes connected to invalid check nodes (i.e. check nodes where the corresponding parity check equation has failed) can be identified. Then, the variable node that is connected to the larger number of invalid check nodes and which had been initially classified as a reliable bit is identified, and replaced by an erasure. That is, the variable node can be reclassified as an unreliable bit. The antipodal decoding process illustrated in FIG. 5 can then be repeated in order to recover the newly-erased bit. The process of checking whether the decoding output is reliable, erasing a further bit, and repeating antipodal decoding can be repeated until a reliable decoding solution is found. The probability that a packet error is caused by a wrongly detected bit increases with the code word length, and follows the following geometric distribution:

$$P_\tau = \sum_{l=1}^{B} \left( \binom{l}{B} \cdot (\tau)^l \cdot (1-\tau)^{B-l} \right) \approx B \cdot \tau \quad (13)$$

where $\tau$ is the error probability of the bits detected by the antipodal detector 101. The approximation in equation (13) holds for small $\tau(\tau \ll B^{-1})$ and shows that most packet errors may be caused by only one flipped bit. Therefore when a packet error has occurred due to a detection error in one of the reliable bits, it may only be necessary to carry out a relatively small number of iterations of further bit erasures in order to find and correct the single flipped bit.

In the embodiment illustrated in FIG. 5, check nodes are processed sequentially by working down a list of check nodes which are connected to at least one unreliable bit. However, in other embodiments a plurality of check nodes could be processed in parallel, to reduce the overall latency of the antipodal decoding process.

In the present embodiment, the antipodal decoder 103 is a hard decoder. That is, the antipodal decoder 103 is configured to receiver hard information in the form of the reliable/unreliable determination from the antipodal detector 101. In other embodiments of the invention, soft decoding maybe used in the antipodal decoder 103. For example, the antipodal decoder 103 may be a belief-propagation decoder. In such embodiments the output of the antipodal detector 101 can be converted into soft information before being passed to the antipodal decoder 103.

Figure 7:
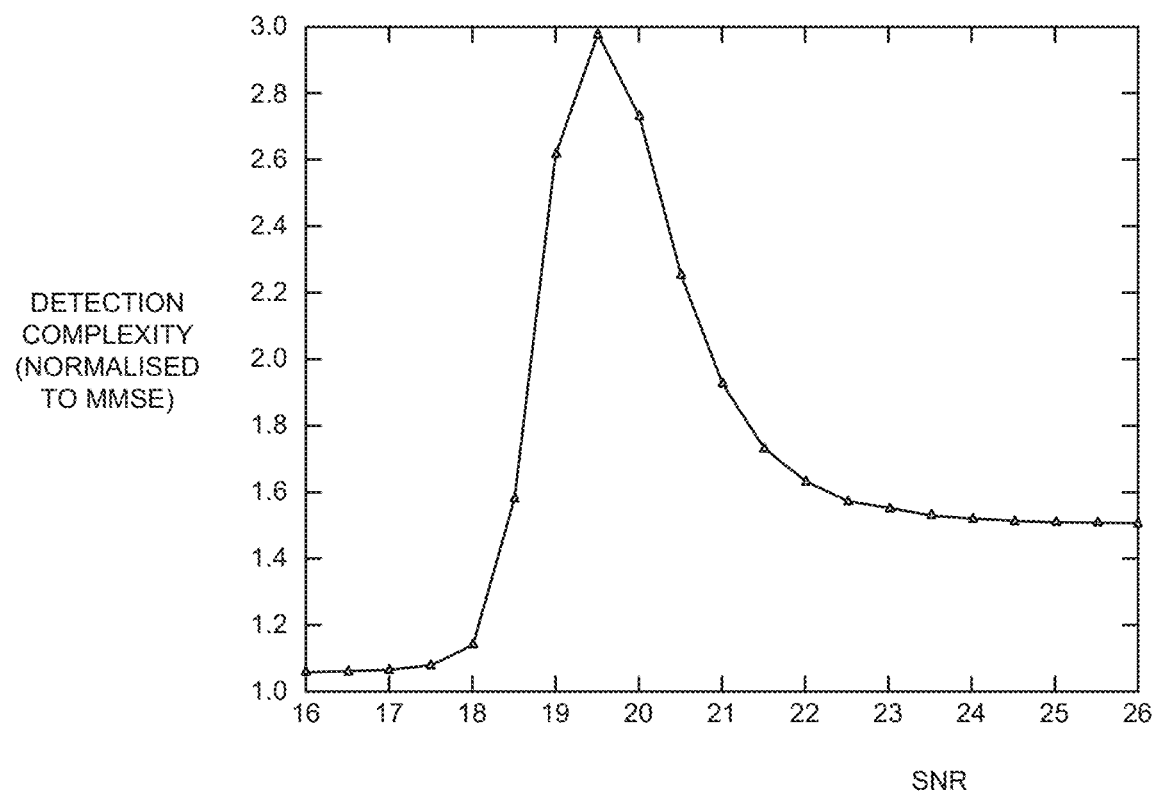
FIG. 7 is a graph plotting the detection complexity as a function of the signal-to-noise ratio (SNR) for antipodal detection, according to an embodiment of the present invention.

Simulation results for embodiments of the present invention will now be described with reference to FIGS. 7 to 11. FIG. 7 is a graph plotting the detection complexity for antipodal detection as a function of the signal-to-noise ratio (SNR), according to an embodiment of the present invention. In FIG. 7, the detection complexity of an antipodal detection process according to an embodiment of the present invention is normalized to the detection complexity of an MMSE scheme. It is shown that the peak average complexity of the invention is just 3× the complexity of the linear MMSE detector. However, at the SNR of its maximum average complexity, the antipodal detection scheme provides 2× the throughput of the soft MMSE scheme.

In the SNR interval between 17 and 21 decibels (dB), some channel realizations allow antipodal detection whilst some do not. In this SNR regime, the antipodal detector has almost the same average complexity as the linear MMSE detector, since MMSE detection will be selected for most channel realizations within this SNR regime. Typically the complexity of sphere decoder based algorithms increase exponentially in the low SNR regime. Embodiments of the invention can overcome this limitation by identifying unfavourable communication situations and switching to an alternative detector, for example by switching from the antipodal detector 101 to the MMSE detector 104 in low SNR conditions. In the present example, below an SNR of 17 dB none of the channel realizations allow antipodal detection, and so for all channel realizations the detection evaluation module 102 selects MMSE detection. Conversely, for an SNR above 21 dB, all of the channel realizations allow antipodal detection, and so the detection evaluation module 102 selects antipodal detection for all channel realizations when the SNR is above 21 dB.

It should be appreciated that the decision of whether to select MMSE or antipodal detection is made on the basis of the calculated reliability metric for the current channel realization, as opposed to being made on the basis of predefined SNR thresholds. As explained above, the SNR threshold at which the switch from MMSE to antipodal detection occurs can be different for different channel realizations.

Figure 8:
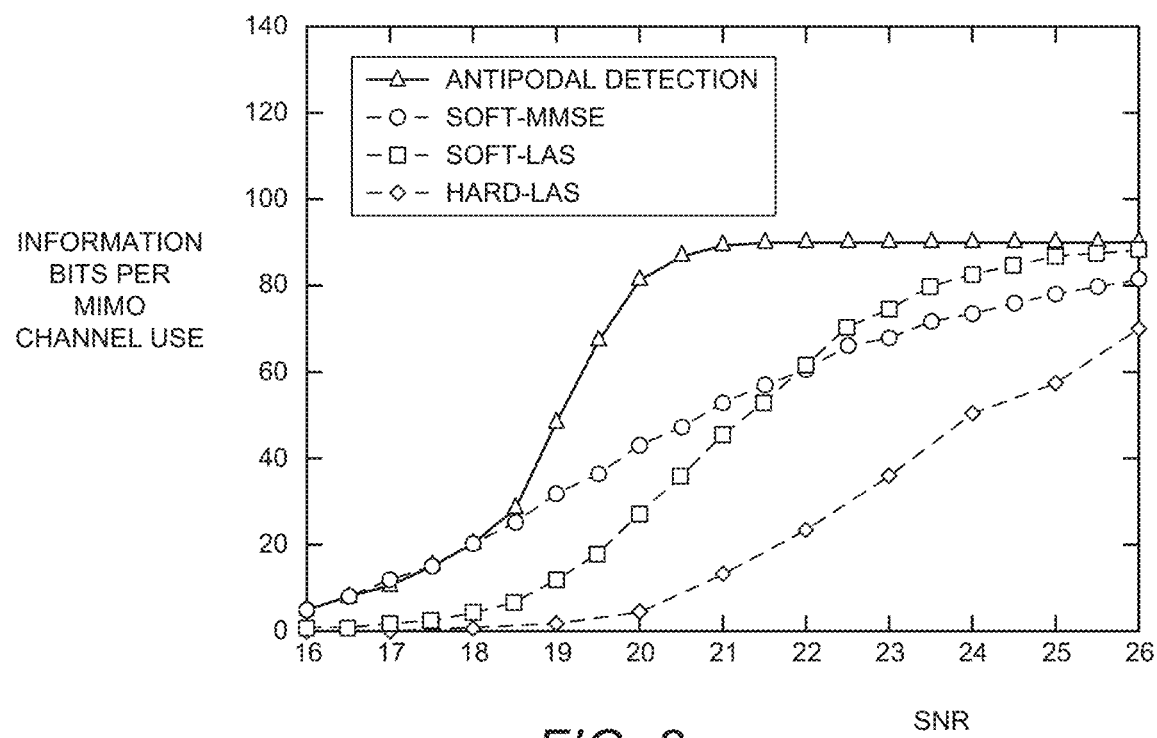
FIG. 8 is a graph comparing the performance of a 16-QAM antipodal detector against 16-QAM soft-MMSE, soft-LAS and hard-LAS detectors, according to an embodiment of the present invention.
Figure 9:
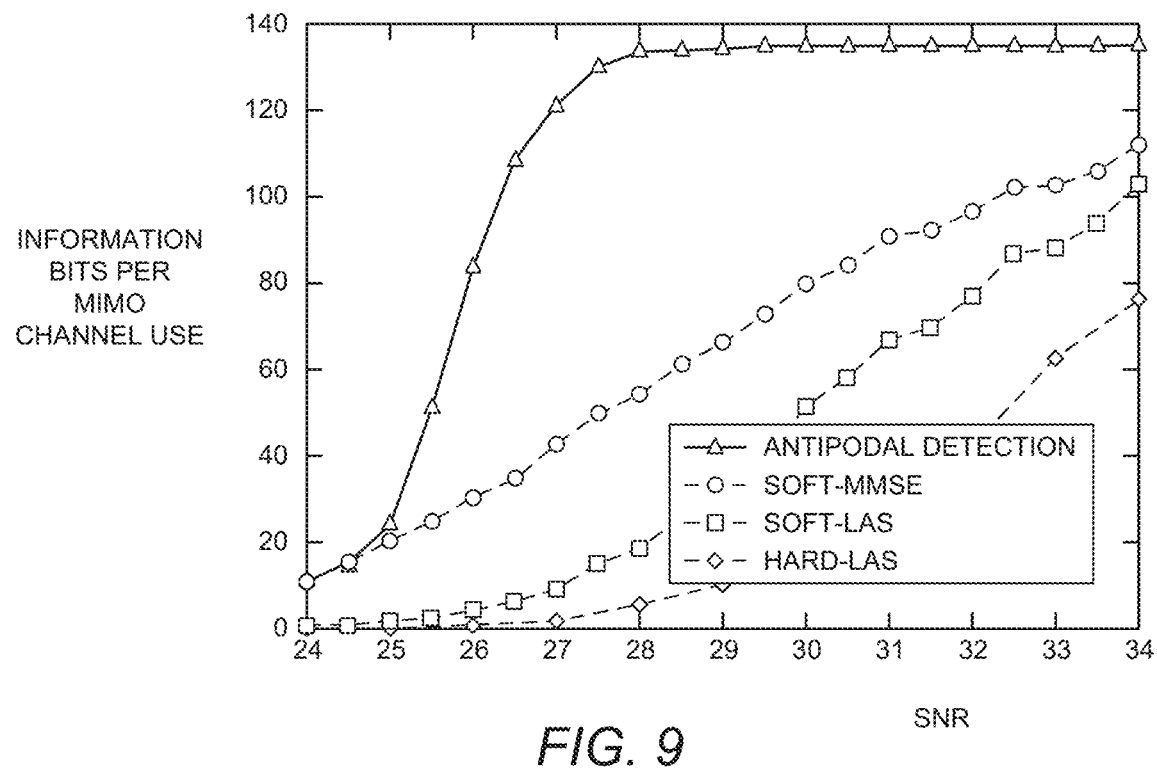
FIG. 9 is a graph comparing the performance of a 64-QAM antipodal detector against 64-QAM soft-MMSE, soft-LAS and hard-LAS detectors, according to an embodiment of the present invention.

FIGS. 8 and 9 illustrate graphs comparing the performance of 16-QAM and 64-QAM antipodal detectors, respectively, against corresponding soft-MMSE, soft-LAS and hard-LAS detectors, according to an embodiment of the present invention. The data plotted in FIGS. 8 and 9 was obtained from simulations of a 30×30 multi-user MIMO scheme, with the MIMO channel modelled as Rayleigh fading and static per transmitted packet. A coding rate of 0.75 was used with a packet length of 648 coded bits, which, due to its short length, is considered to be one of the most challenging but also one of the most useful packet lengths for low latency applications.

In FIGS. 8 and 9 the antipodal detectors are compared against three benchmark detection/decoding schemes of similar complexity. The first scheme is LDPC encoded, and employs an MMSE soft detector and a belief-propagation channel decoder. The second scheme is also LDPC encoded with the same code, and uses the soft version of the LAS detector. The third scheme is conventionally encoded, with a punctured [171, 131] (octal) code of a constrained length of 7, and uses the hard version of the LAS detection algorithm followed by a Viterbi decoder. The 16-QAM and 64-QAM antipodal detectors of the present embodiment are sphere-decoding based detectors configured to use a one-visited-node-per-cycle architecture. For practical reasons, a latency constraint of $N_t$ visited nodes (or clock cycles) is imposed which, since the maximum complexity per visited node is $N_r$, imposes an upper-bound of $O(aN_t^2$ in complexity. Here, values of $\alpha=16$ and $\beta=0.025$ are used, although it will be appreciated that these are merely chosen by way of example.

FIGS. 8 and 9 show how the achievable throughput of an antipodal detector according to an embodiment of the present invention compares with the throughput achieved by three other detection/decoding schemes. Here the throughput is defined as $$T = N_t \cdot \log_2(|Q|) \cdot r_c \cdot (1 - PER) \tag{14}$$

where PER is the packet error rate, and $r_c$ is the code rate. At an SNR of 20 dB the antipodal detector achieves an average throughput of 82 information bits per MIMO channel use, which is more than 3× the throughput of the soft LAS scheme. At the same SNR, the antipodal detector outperforms the hard LAS scheme by almost a factor 20×. The soft MMSE scheme achieves 43.43 bits MIMO channel use that is about half the throughput of the antipodal detector. As shown in FIG. 9, the throughput gains of the antipodal detector further increase for 64-QAM modulation. At an SNR of 28 dB the antipodal detector outperforms the soft MMSE scheme by a factor of 2.4×. Furthermore, the antipodal detector provides more than 6× the throughput of the soft LAS scheme, and more than 20× the throughput of the hard LAS scheme.

Figure 10:
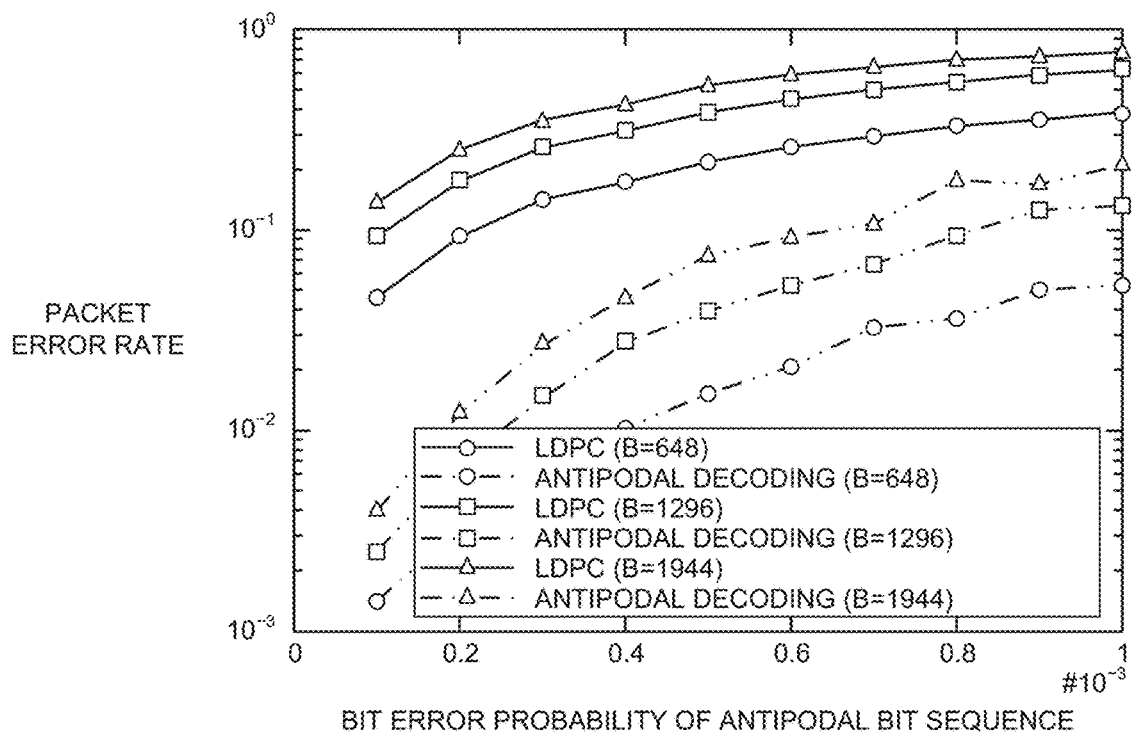
FIG. 10 is a graph comparing packet error rates of antipodal decoders against low-density parity check (LDPC) decoders, according to an embodiment of the present invention.
Figure 11:
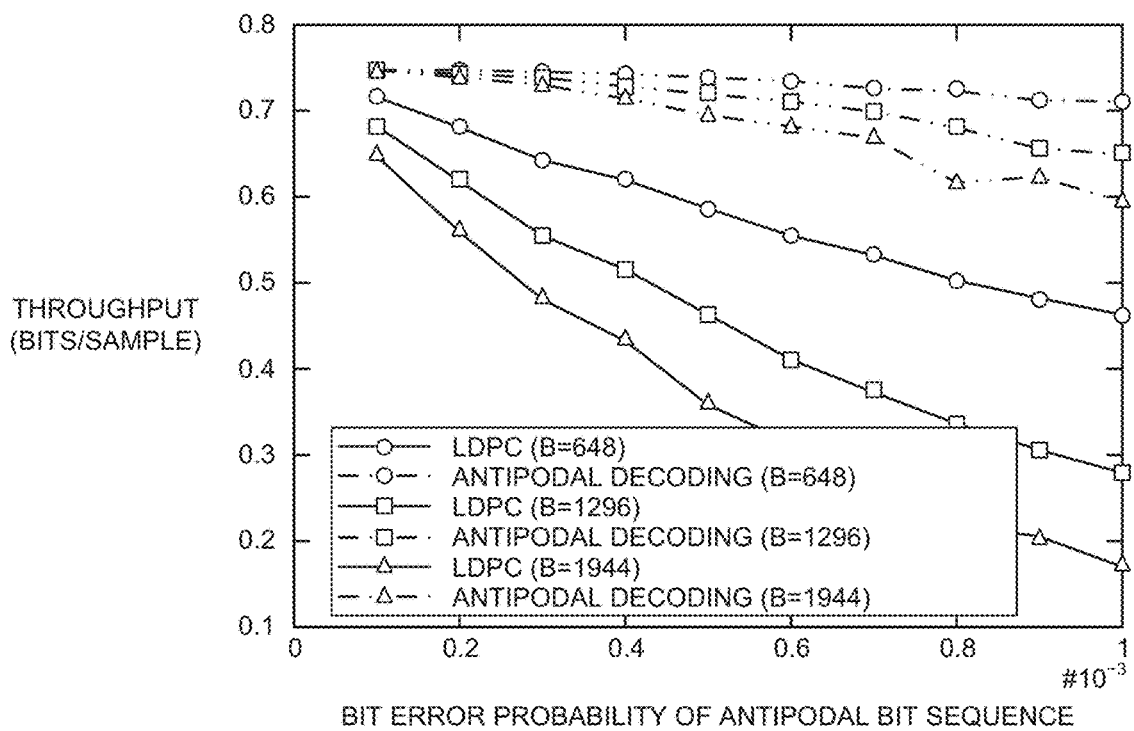
FIG. 11 is a graph comparing the system throughput as a function of the bit error probability for antipodal decoders against low-density parity check (LDPC) decoders, according to an embodiment of the present invention.

FIG. 10 is a graph comparing packet error rates of antipodal decoders against low-density parity check (LDPC) decoders, according to an embodiment of the present invention; and FIG. 11 is a graph comparing the system throughput as a function of the bit error probability for antipodal decoders against low-density parity check (LDPC) decoders, according to an embodiment of the present invention.

FIGS. 10 and 11 show how the detection performance of the antipodal decoder compares against a LDPC decoder for a simulated antipodal bit sequence. The simulated antipodal bit sequence of the present example uses a modified a Binary Ensure Channel (BEC) with erasure probability 0.1, and includes randomly-flipped non-erased bits with a probability $P_e$. The packet error rates of the antipodal decoder and the LDPC decoder increase when increasing the parameter T, as would be expected. However, the antipodal decoder outperforms the LDPC decoder by an order of magnitude for all tested packet lengths and over the whole evaluated range of τ.

Embodiments of the present invention can be particularly advantageous for systems with a large number of mutually interfering information streams, of the order of tens of streams. However, embodiments of the present invention are not limited to use in such systems, and may also be applied to systems with massive numbers of mutually interfering information streams, of the order of hundreds of streams, albeit with smaller gains. In comparison to systems with massive numbers of mutually interfering information streams, systems with large numbers of streams maybe of more interest for next-generation wireless communication networks, since the practical implementation of wireless communication systems with hundreds of interfering information streams is currently infeasible. Embodiments of the present invention may therefore offer an advantage over prior art detectors which are only applicable to systems with massive numbers of mutually interfering information streams such as PDA based detectors, which rely on the asymptotic characteristics found in systems with massive numbers of mutually interfering information streams, but which are not suitable for use in systems with large numbers of streams since this approximation no longer holds.

Furthermore, embodiments of the present invention provide an adjustable complexity/latency approach, for detecting and decoding a large number (in the order of tens) mutually interfering information streams. Embodiments of the present invention have been described above which comprise novel detectors and decoding techniques that can be used either in conjunction or separately. For example, the detectors and decoding techniques disclosed herein maybe used both in the transmitter and/or in the receiver. In general, embodiments of the present invention may be applied to any problem at the transmitter or receiver that requires a vector solution to be found which optimizes (i.e. minimizes or maximizes) a specific detection metric. For example, the detectors and decoding techniques described above can be used with any "sphere encoding" or "vector perturbation" methods used for MIMO transmit beam-forming.

Embodiments of the invention have been described in which a detection evaluation module classifies detected symbols as reliable or unreliable, and also checks whether the current systems parameters are sufficient to permit reliable symbol detection. For example, the detection evaluation module may classify the detected symbols using a method as described above with reference to steps S301 and S302 of FIG. 3, and may determine whether the system parameters permit reliable symbol detection by applying a reliability metric, as described above with reference to steps S304 and S305 of FIG. 3.

However, in some embodiments a detection evaluation module may only perform one of these processes. In some embodiments a detection evaluation module may classify detected symbols as reliable or unreliable, without also checking whether the system parameters permit reliable symbol detection. For example, the receiving apparatus may further include a data processing module that processes the detected data symbols according to the result of the reliable/unreliable determination. In some embodiments, the data processing module maybe a decoder such as the one described above with reference to FIGS. 4 to 6, which processes the detected data symbols in order to correct errors. Alternatively, in another embodiment a detection evaluation module may check whether the system parameters permit reliable symbol detection and take corrective action if necessary, without separately classifying detected symbols as reliable or unreliable.

Whilst certain embodiments of the invention have been described herein with reference to the drawings, it will be understood that many variations and modifications will be possible without departing from the scope of the invention as defined in the accompanying claims.

The invention claimed is:

1. Apparatus for performing symbol detection on a plurality of mutually interfering information streams transmitted in a wireless communication system, the apparatus comprising:
   a first detector configured to receive an input signal comprising a plurality of mutually interfering information streams, and to detect a transmitted symbol for each of the plurality of mutually interfering information streams by searching for a vector solution to an optimization problem; and
   a detection evaluation module configured to classify the detected symbol as either reliable or unreliable,
   wherein the detection evaluation module is configured to classify the whole detected symbol as either reliable or unreliable, such that the detection evaluation module is configured to classify all bits contained within the detected symbol as reliable in dependence on the detected symbol being classified as reliable, and to classify all bits within the detected symbol as unreliable in dependence on the detected symbol being classified as unreliable,
   wherein the detection evaluation module is configured to only classify said detected symbol in response to one or more conditions being fulfilled, and
   wherein said one or more conditions includes a preset latency limit, such that the detection evaluation module is configured to only classify said detected symbol in response to the search for the vector solution exceeding the preset latency limit.

2. The apparatus of claim 1, wherein the detection evaluation module is configured to classify the detected symbol as reliable in dependence on the first detector only finding a single solution to the optimization problem.

3. The apparatus of claim 2, wherein the detection evaluation module is configured to classify the detected symbol as unreliable in dependence on the first detector finding more than one solution to the optimization problem.

4. The apparatus of claim 1, wherein for each such detected symbol classified by the detection evaluation module, the detection evaluation module is configured to only classify the detected symbol as either reliable or unreliable, such that the outcome of said classification falls into one of two opposing scenarios.

5. The apparatus of claim 1, wherein in response to the detected symbol being classified as unreliable, the apparatus is configured to switch from the first detector to a second detector to perform subsequent symbol detection for said one of the plurality of mutually interfering information streams.

6. The apparatus of claim 1, wherein the detection evaluation module is configured to determine whether the current system parameters permit reliable symbol detection by calculating a reliability metric relating to a detection reliability of the detected symbol, and comparing the calculated reliability metric to a threshold.

7. The apparatus of claim 6, wherein the detection evaluation module is configured to calculate the reliability metric based on a pruning parameter applied by the first detector when searching for the vector solution.

8. The apparatus of claim 1, wherein the detector is configured to transform the optimization problem into a tree search and search the tree for the vector solution.

9. The apparatus of claim 8, wherein the preset latency limit is defined in terms of a number of nodes visited during the tree search.

10. The apparatus of claim 1, wherein the first detector is configured to apply an early cut criterion when searching for the vector solution and to terminate the search if a solution is found which satisfies the early cut criterion, the early cut criterion relating to the probability of a candidate solution being the correct vector solution, and
    wherein in response to the first detector finding a solution which satisfies the early cut criterion the detection evaluation module is configured to determine that the detected symbol is reliable.

11. The apparatus of claim 1, further comprising:
    a decoder configured to receive a plurality of detected symbols from the detector and apply a decoding algorithm to the plurality of detected symbols to recover information from said one of the mutually interfering information streams.

12. The apparatus of claim 1, further comprising:
    a data processing module configured to receive data symbols detected by the first detector and symbol classification information from the detection evaluation module, the symbol classification information indicating whether each of the detected data symbols is classified as reliable or unreliable,
    wherein the data processing module is further configured to process the detected data symbols in accordance with the symbol classification information.

13. The apparatus of claim 12, wherein the data processing module is configured to disregard any data symbols classified as unreliable by the detection evaluation module.

14. A method of performing symbol detection on a plurality of mutually interfering information streams transmitted in a wireless communication system, the method comprising:
- receiving an input signal comprising a plurality of mutually interfering information streams;
- detecting a transmitted symbol for each of the plurality of mutually interfering information streams by searching for a vector solution to an optimization problem; and
- classifying the whole detected symbol as either reliable or unreliable, such that all bits contained within the detected symbol are classified as reliable in dependence on the detected symbol being classified as reliable, and all bits within the detected symbol are classified as unreliable in dependence on the detected symbol being classified as unreliable,
- wherein said detected symbol is only classified in response to one or more conditions being fulfilled, and
- wherein said one or more conditions includes a preset latency limit, such that said detected symbol is only classified in response to the search for the vector solution exceeding the preset latency limit.

15. The method of claim 14, further comprising:
applying a decoding algorithm to the plurality of detected symbols to recover information from said one of the mutually interfering information streams.

16. A non-transitory computer-readable storage medium arranged to store computer program instructions which, when executed, perform the method according to claim 14.

17. Apparatus for performing symbol detection on a plurality of mutually interfering information streams transmitted in a wireless communication system, the apparatus comprising:
- a first detector configured to receive an input signal comprising a plurality of mutually interfering information streams, and to detect a transmitted symbol for each of the plurality of mutually interfering information streams by searching for a vector solution to an optimization problem; and
- a detection evaluation module configured to classify the detected symbol as either reliable or unreliable,
- wherein the detection evaluation module is configured to only classify said detected symbol in response to one or more conditions being fulfilled, and
- wherein said one or more conditions includes a preset latency limit, such that the detection evaluarion module is configured to only classify said detected symbol rewponse to the search for the vector solution exceeding the preset latency limit.

* * * * *